J. W. GREENE.
MOLD FOR MAKING DENTAL PLATES.
APPLICATION FILED JAN. 18, 1913.
1,077,703.
Patented Nov. 4, 1913.
2 SHEETS—SHEET 1.
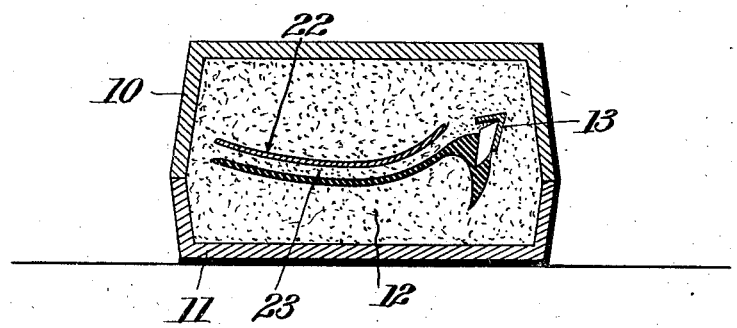
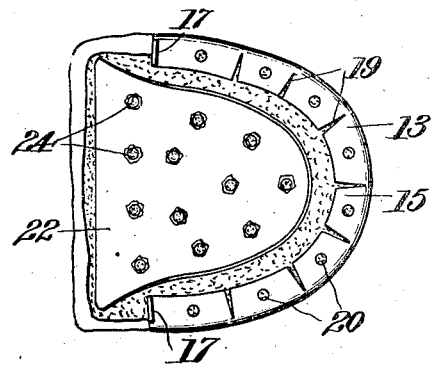
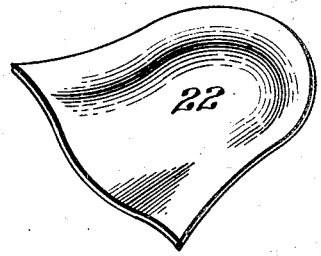
Jacob W. Greene
INVENTOR
WITNESSES
Attorneys J. W. GREENE.
MOLD FOR MAKING DENTAL PLATES.
APPLICATION FILED JAN. 18, 1913.
1,077,703.
Patented Nov. 4, 1913.
2 SHEETS—SHEET 2.
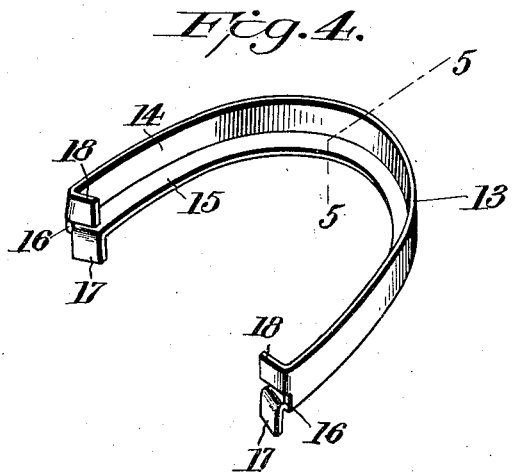
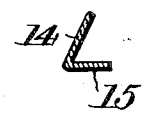
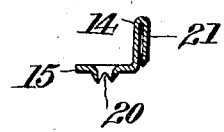
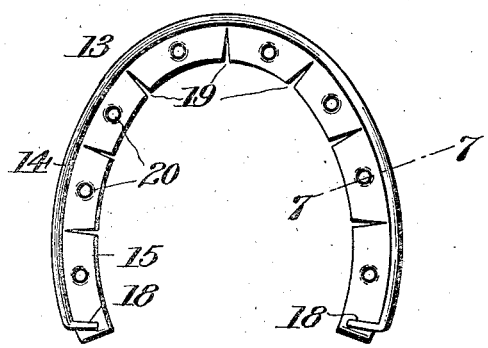
Jacob W. Greene
INVENTOR
WITNESSES
Attorneys

UNITED STATES PATENT OFFICE.

JACOB W. GREENE, OF CHILLICOTHE, MISSOURI.

MOLD FOR MAKING DENTAL PLATES.

1,077,703.   Specification of Letters Patent.   Patented Nov. 4, 1913.

Application filed January 18, 1913. Serial No. 742,962.

*To all whom it may concern:*

Be it known that I, JACOB W. GREENE, a citizen of the United States, residing at Chillicothe, in the county of Livingston and State of Missouri, have invented certain new and useful Improvements in Molds for Making Dental Plates; and I do hereby declare the following to be a full, clear, and exact description of the invention, such as will enable others skilled in the art to which it appertains to make and use the same.

This invention is a mold for making dental plates designed more particularly to strengthen the investment in the construction of artificial dentures.

In the usual method of setting teeth on a plate, especially of vulcanized rubber plates, an investment of a fresh mixed plaster compound is poured into a mold and put under pressure in the ordinary manner. The plaster of Paris, or compound, has been found defective for this purpose, in that it disintegrates under heat and moisture, and yields under the pressure required in producing vulcanized dental plates. This frailty or uncertainty in the employment of such materials results in porosity and misfitting dental plates, and in malocclusion in artificial dentures. Moreover, it frequently happens that in pouring and finally filling the last half of a dental flask or mold and in order to reach narrow and somewhat inaccessible places, the plaster investment must be too thinly mixed to produce a strong body, hence the investment so formed is correspondingly weak. This is especially true when air bubbles occur in the pouring. Furthermore, dentists often find their rubber plates come out of the vulcanizer much thicker than the base plate pattern which covered the model. This extra thickness may be attributed to the compressive yielding of the faulty plaster investment where it antagonized the roof arch of the model or cast.

To remedy the defects specified, I employ supporting devices for the investment, one of which devices operates to retain the teeth in their occlusive position and the other device serves to prevent the dental plate from assuming extra thickness during the molding and vulcanizing processes, both of which devices operate to strengthen the investment.

The invention consists in the employment of an adjustable element which may be readily positioned over, or onto, the arch of teeth after they have been set and arranged on the usual base plate into occlusive position, said element comprising a substantially curved structure having a front wall and a rear wall, producing a channel between said walls for the reception of the teeth, and means for securing the device in position.

The invention consists, further, in the process, and the employment of a palatal support wherein a layer of investment may be secured adjacent to the vulcanite or other material employed to produce the plate, for the purpose of giving proper strength to the dental plate and also prevent the plate from assuming undue thickness.

The invention consists, further, in certain features of construction and the combination and arrangement of parts as will be more fully hereinafter described and pointed out in the claims.

In the accompanying drawing, I have illustrated different embodiments of the invention, but the constructions shown therein are to be understood as illustrative only and not as defining the limits of the invention.

Figure 1 is a transverse sectional view through a dental flask or mold showing the employment of the devices. Fig. 2 is a plan view of the tooth and palatal supports in position on a plate. Fig. 3 is a perspective view of the palatal support. Fig. 4 is a perspective view of the tooth-supporting element. Fig. 5 is a sectional view on the line 5—5 of Fig. 4. Fig. 6 is a plan view of another embodiment of the tooth-supporting element, and Fig. 7 is a sectional view on the line 7—7 of Fig. 6. Fig. 8 is a fragmentary view of another embodiment of the invention.

The invention contemplates the use of an ordinary dental flask having the upper section 10 and the lower section 11, which is adapted to contain the usual investment material indicated at 12, which may be placed in the flask in the ordinary manner. After the model of the mouth has been made and the other preliminary steps taken, the artificial teeth are set in their occlusive position and are retained in said position by a tooth-supporting element 13, in the form of a reinforcing plate. This element is disclosed in Figs. 4 and 5 showing the same provided with a vertical wall 14 and a substantially horizontal wall 15 forming a channel between said walls for the reception of the teeth. In Fig. 5, the reinforcing plate 13 is bent so that the walls form an angular channel. This plate may be made of any suitable material, and in Figs. 4 and 5, this element is shown provided with plain walls. This tooth supporting element is adapted to be bent in proper shape to fit the contour or arch shape of the artificial teeth which have been set in wax, the outer edges of the teeth fitting within the V-shaped channel of the tooth-supporting element. At the ends of this element, the walls are separated or split, as at 16, to permit the lower wall 15 to be bent outwardly, forming an anchor 17 for the tooth support to engage the surrounding investment, while the free end of wall 14 is bent, as at 18, to produce a clip or clamping means for retaining the support upon the teeth.

Prior to applying the support to the arch of teeth, it is preferred to place some of the investment in the V-shape channel, and to allow the teeth to rest in this investment and be sealed in position thereby. In this construction of the device, it may be stamped or otherwise produced as a whole and still have adjustable mobility to fit in place on the teeth, as will be readily understood. In Figs. 6 and 7, however, I have illustrated a modified form of the tooth-supporting element in which the lower wall 15 is provided with a number of transverse slots 19, and also with a plurality of apertures 20. As the slitting of this lower member 15 may weaken the plate, if made of very thin metal, it may be found desirable to reinforce the plate by doubling either or both of the walls upon themselves, more particularly the front wall 14, as shown at 21 in Fig. 7. The provision of the slots 19 permits the easy adjustment of the tooth-supporting element to an arc of teeth as it allows the bending of the element to take place around the wall 14 or 14-21 thereof. The provision of the aperture 20 permits the investment to protrude through said apertures and thereby lock the plate more firmly in position on the teeth. If desired, the surplus metal may serve as anchoring means, as shown in Fig. 7. Should thin metal be used, it may be desirable to crimp or corrugate the walls 14, or 15, as shown in Fig. 8. By the employment of this tooth-supporting element, the teeth are always maintained in their occlusive position and are prevented from spreading apart during the molding and vulcanizing processes. This is especially true where gum-section teeth are used and the joints are apt to open by the yielding of unsupported, faulty plaster investment.

Coöperating with the tooth-supporting element 13, in the production of artificial dental plates is a palatal support 22 which is designed to prevent the collapsing or distortion of the roof or vault investment. In Fig. 3, the palatal support is shown as a thin plate having depressions and curved surfaces to substantially conform to the roof of a base plate. This palatal or reinforcing plate may be constructed of any desired material, such as cast metal, sheet metal, and is adapted to be placed in position prior to the application of the plaster investment around the model. A thin layer of plaster investment 23 is placed upon one surface of the palatal plate 22, and the plate is thence set in position next to the roof of the model, or base plate. As shown in Fig. 2, the tooth and palatal supports 13 and 22, respectively, operate, together with the plaster investment and model in connection with them, to maintain the teeth and the model plate in their proper positions. The application of this palatal plate also prevents the vulcanized plate from assuming a distorted surface or becoming too thick during the molding or vulcanizing process by preventing compression in the plaster investment. It may be found desirable, also, to provide the plate 22 with a series of apertures 24, serving as anchoring means for the plate, said apertures permitting the investment to pass through the same and thereby secure the plate in its adjusted position on the model. This roof support, or palatal plate, prevents the yielding of the plaster investment under it during the process of packing and vulcanizing. The plaster investment is placed in the lower half of the mold 11 in the usual manner, and the model with the palatal and tooth support therein, as described, is next placed in position in the flask. After the palatal support has been placed firmly in position, the investment is then poured around the rest of the model, in the usual manner, for the vulcanizing molding process.

Having thus fully described my invention, what I claim as new and desire to secure by Letters Patent is:—

1. In a device of the character described, the combination, with a dental flask, a dental model, and the investment of the flask, of a tooth-supporting element adapted to be positioned over the teeth, and means for retaining said tooth supporting element in position for the purposes described.

2. In a device of the character described, the combination, with a dental flask, a dental model, and the investment of the flask, of a tooth supporting element adapted to be positioned over the arch of the teeth, said tooth supporting element comprising a plurality of walls forming a channel, and means for retaining said element on the teeth.

3. In a device of the character described, the combination, with a dental flask, a dental model, and the investment of the flask, of a tooth-supporting element adapted to be positioned over the teeth, said element being provided with a channel for the reception of the teeth, a thin layer of investment within said channel and substantially surrounding the teeth, and means for securing the tooth supporting element in position.

4. In a device of the character described, the combination, with a dental flask, a dental model, and the investment of the flask, of a palatal support positioned over the arch or roof of the base plate, and means for separating the palatal support from the dental mold, for the purpose described.

5. In a device of the character described, the combination, with a dental flask, a dental model, and the investment of the flask, of a palatal support positioned over the arch or roof of the base plate, and a thin layer of investment positioned between the support and the base plate.

6. In a device of the character described, the combination, with a dental flask, a dental model, and the investment of the flask, of a palatal support positioned over the arch or roof of the base plate, and means for maintaining the palatal support in position with reference to the base plate and the investment.

7. A tooth supporting element comprising a substantially pliable plate having a plurality of walls forming a channel, means on said plate for securing the same to the teeth, and means for anchoring the plate within the investment of a dental mold or flask.

8. A tooth-supporting element comprising a plate having a plurality of walls forming a channel, one of said walls having a plurality of slots and a plurality of perforations, means at each end of the plate for securing the same to the teeth of a dental model, and means at the end of the plate for anchoring the same in the investment of a dental model or flask.

9. In a palatal support of the character described, a plate having an irregular surface of substantially the contour of the human mouth, said plate being provided with a plurality of perforations.

10. In a palatal support of the character described, a plate having an irregular surface of substantially the contour of the vault of a human mouth, said plate being provided with a plurality of perforations and a roughened surface, for the purpose described.

In testimony whereof, I affix my signature, in presence of two witnesses.

JACOB W. GREENE.

Witnesses:
R. W. REYNOLDS,
L. N. PARKER.